(12) United States Patent
Tian et al.

(10) Patent No.: US 10,129,843 B2
(45) Date of Patent: Nov. 13, 2018

(54) SYNCHRONIZATION SIGNAL SENDING METHOD AND APPARATUS, AND SYNCHRONIZATION SIGNAL RECEIVING METHOD AND APPARATUS

(71) Applicant: Huawei Technologies Co., Ltd., Shenzhen (CN)

(72) Inventors: Chunchang Tian, Beijing (CN); Yong Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 15/431,429

(22) Filed: Feb. 13, 2017

(65) Prior Publication Data

US 2017/0156121 A1 Jun. 1, 2017

Related U.S. Application Data

(63) Continuation of application No. PCT/CN2014/084276, filed on Aug. 13, 2014.

(51) Int. Cl.
*H04W 56/00* (2009.01)
*H04W 16/10* (2009.01)
(Continued)

(52) U.S. Cl.
CPC ......... *H04W 56/001* (2013.01); *H04L 5/0044* (2013.01); *H04L 5/0048* (2013.01);
(Continued)

(58) Field of Classification Search
CPC . H04W 56/0015; H04W 16/04; H04W 16/10; H04L 5/14; H04L 5/0048; H04L 5/0082
See application file for complete search history.

(56) References Cited

U.S. PATENT DOCUMENTS 9,125,135 B2 * 9/2015 Parkvall ............... H04W 48/08
9,967,729 B2 * 5/2018 Wang .................... H04W 8/005
(Continued)

FOREIGN PATENT DOCUMENTS

CN 102014462 A 4/2011
CN 102239716 A 11/2011
(Continued)

OTHER PUBLICATIONS

"Design considerations on Radio-Interface Based network Synchronization," 3GPP TSG RAN WG1 Meeting #76, R1-140320, Prague, Czech Republic, 3rd Generation Partnership Project, Valbonne, France (Feb. 10-14, 2014).
(Continued)

Primary Examiner — Redentor Pasia
(74) Attorney, Agent, or Firm — Leydig, Voit & Mayer, Ltd.

(57) ABSTRACT

The present invention provides a synchronization signal sending method and apparatus and a synchronization signal receiving method and apparatus. The synchronization signal sending includes: a sending module, configured to send a first-type subframe, where the first-type subframe includes a physical downlink shared channel (PDSCH) and a first synchronization channel, the first synchronization channel includes a first primary synchronization signal (PSS) and a first secondary synchronization signal (SSS); and a processing module, configured to control the sending module to switch from sending the first-type subframe to sending a second-type subframe. The sending module is further configured to send the second-type subframe under the control of the processing module, where the second-type subframe includes a physical uplink shared channel (PUSCH) and a second synchronization channel, the second synchronization channel includes a second PSS or a second SSS.

20 Claims, 8 Drawing Sheets

(51) Int. Cl.
   *H04W 16/04* (2009.01)
   *H04L 5/14* (2006.01)
   *H04W 72/04* (2009.01)
   *H04L 5/00* (2006.01)
   *H04L 27/26* (2006.01)
   *H04W 16/32* (2009.01)
   *H04J 11/00* (2006.01)
   *H04W 36/04* (2009.01)

(52) U.S. Cl.
   CPC ............ *H04L 5/14* (2013.01); *H04L 27/2613* (2013.01); *H04L 27/2692* (2013.01); *H04W 16/04* (2013.01); *H04W 16/10* (2013.01); *H04W 16/32* (2013.01); *H04W 56/0015* (2013.01); *H04W 72/042* (2013.01); *H04W 72/0413* (2013.01); *H04W 72/0446* (2013.01); *H04J 11/0069* (2013.01); *H04L 5/143* (2013.01); *H04L 5/1469* (2013.01); *H04W 36/04* (2013.01)

(56) References Cited

U.S. PATENT DOCUMENTS

| | | | | |
|---|---|---|---|---|
| 9,986,523 | B2* | 5/2018 | Yi | H04W 56/0015 |
| 9,986,546 | B2* | 5/2018 | Dinan | H04W 72/042 |
| 2011/0274031 | A1* | 11/2011 | Gaal | H04L 5/0051 |
| | | | | 370/315 |
| 2012/0020272 | A1 | 1/2012 | Lee et al. | |
| 2012/0201218 | A1* | 8/2012 | Yamamoto | H04B 7/269 |
| | | | | 370/329 |
| 2012/0270585 | A1 | 10/2012 | Feng et al. | |
| 2013/0188624 | A1 | 7/2013 | Lee | |
| 2013/0250818 | A1* | 9/2013 | Gaal | H04W 56/00 |
| | | | | 370/277 |
| 2014/0133395 | A1* | 5/2014 | Nam | H04B 7/0452 |
| | | | | 370/328 |
| 2014/0211670 | A1 | 7/2014 | Alex et al. | |
| 2014/0226649 | A1* | 8/2014 | Webb | H04L 5/0023 |
| | | | | 370/350 |
| 2014/0348063 | A1* | 11/2014 | Kang | H04L 5/0048 |
| | | | | 370/328 |
| 2015/0163801 | A1* | 6/2015 | Sadek | H04W 72/0446 |
| | | | | 370/336 |
| 2017/0164400 | A1 | 6/2017 | Fong et al. | |
| 2017/0238272 | A1* | 8/2017 | You | H04W 56/0015 |
| | | | | 370/350 |
| 2017/0303226 | A1* | 10/2017 | Awad | H04B 7/2656 |

FOREIGN PATENT DOCUMENTS

| | | |
|---|---|---|
| CN | 102907152 A | 1/2013 |
| CN | 103428846 A | 12/2013 |
| CN | 103491041 A | 1/2014 |
| CN | 103974282 A | 8/2014 |
| JP | 2011082800 A | 4/2011 |
| WO | 2013166720 A1 | 11/2013 |
| WO | WO 2014067132 A1 | 5/2014 |
| WO | 2014111894 A1 | 7/2014 |

OTHER PUBLICATIONS

"Design of radio-based network synchronization for intra-operator scenarios," 3GPP TSG RAN WG1 Meeting #76bis, Shenzhen, China, R1-141342, 3rd Generation Partnership Project, Valbonne, France (Mar. 31-Apr. 4, 2014).

"Design of radio-based network synchronization for inter-operator scenarios," 3GPP TSG RAN WG1 Meeting #76bis. Shenzhen, China, R1-141343, 3rd Generation Partnership Project, Valbonne, France (Mar. 31-Apr. 4, 2014).

"$3^{rd}$ Generation Partnership Project; Technical Specification Group Radio Access Network; Evolved Universal Terrestrial Radio Access (E-UTRA); Medium Access Control (MAC) protocol specification (Release 12)," 3GPP TS 36.321, V.12.2.1, $3^{rd}$ Generation Partnership Project, Valbonne, France (Jun. 2014.

"$3^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.2.0, $3^{rd}$ Generation Partnership Project, Valbonne, France (Jun. 2014).

CN 201480029182.3, Office Action, dated Aug. 28, 2018.

* cited by examiner

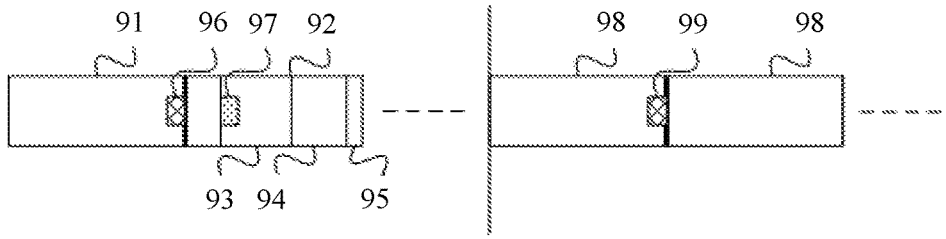

FIG. 9A

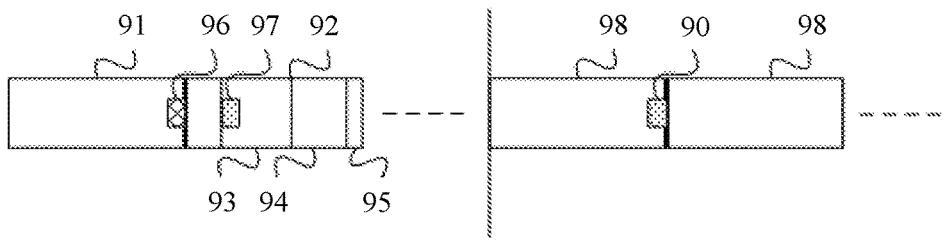

FIG. 9B

| A first node sends a first-type subframe, where the first-type subframe includes a PDSCH and a first synchronization channel, the first synchronization channel includes a first PSS and a first SSS, and the first PSS and the first SSS are used to enable a second node that receives the first PSS and the first SSS to synchronize with the first node | S101 |
|---|---|
| The first node switches from sending the first-type subframe to sending a second-type subframe | S102 |
| The first node sends the second-type subframe, where the second-type subframe includes a PUSCH and a second synchronization channel, the second synchronization channel includes a second PSS or a second SSS, the second PSS or the second SSS is used to enable the second node that receives the second PSS or the second SSS to keep synchronous with the first node, the second PSS is generated according to the first PSS, and the second SSS is generated according to the first SSS | S103 |

FIG. 10

SYNCHRONIZATION SIGNAL SENDING METHOD AND APPARATUS, AND SYNCHRONIZATION SIGNAL RECEIVING METHOD AND APPARATUS

CROSS-REFERENCE TO RELATED APPLICATIONS

This application is a continuation of International Application No. PCT/CN2014/084276, filed on Aug. 13, 2014, the disclosure of which is hereby incorporated by reference in its entirety.

TECHNICAL FIELD

Embodiments of the present invention relate to the field of wireless communications technologies, and in particular, to a synchronization signal sending method and apparatus and a synchronization signal receiving method and apparatus.

BACKGROUND

An evolution trend from a homogeneous network to a heterogeneous network is presented during a network evolution process of a Long Term Evolution (LTE) system and a Long Term Evolution Advanced (LTE-A) system. In a heterogeneous network architecture, more small cell (SC) devices are increased within coverage of a macro base station (Macro evolved Node B, Macro eNodeB), to further increase a network coverage capacity. A small cell device refers to a low-power radio access node. Compared with a macro base station, the small cell device has lower power, a smaller coverage area, and a smaller size. For example, the small cell device includes a home eNodeB (Home eNodeB), a micro base station (Pico eNodeB), and a remote radio head (Remote Radio Head, RRH).

With increasing requirements for the network coverage capacity, small cell densification is a main solution to the increasing requirements for the network coverage capacity. However, there are many actual difficulties in densely deploying small cell devices. The following problem is caused during data transmission over a backhaul (backhaul) between numerous small cell devices because of synchronization between small cells. The backhaul generally refers to a data transmission path between a small cell device and a core network (Core Network). A small cell device accessed by user equipment (User Equipment, UE) is referred to as an AP. The AP transmits, to the core network by means of forwarding of multiple small cell devices, data sent by the UE. Data transmission paths between small cell devices on a data transmission path from the AP to the core network are referred to as backhauls. In a network of densely deployed small cell devices, user equipment (User Equipment, UE) may be frequently handed over between multiple small cell devices. Therefore, a backhaul path of a small cell device needs to be flexibly changed. In a flexible backhaul technical solution, during data transmission between small cell devices, a transmission path and a transmission manner may change. When a transmission manner of a small cell device is changed, for example, when the small cell device switches from a state of sending an uplink subframe to a state of sending a downlink subframe, another small cell device that receives data sent by the small cell device needs to first spend a specific period of time synchronizing with the small cell device that sends the data. In this period of time, data transmission cannot be performed between the small cell devices.

Generally, there are multiple manners to implement a backhaul, such as a fiber, a microwave, and a relay (Relay). However, if a wired backhaul manner, such as the fiber, is adopted, a new route needs to be set, and this causes relatively high costs. The network of densely deployed small cell devices is generally in a mature city region, and it is unlikely to carry out a setting project of a new route. Therefore, a wireless backhaul manner is a main development direction for a manner of densely deploying small cell devices.

In a relay (Relay) technology of the wireless backhaul manner, when transmitting an uplink subframe, a small cell device periodically retains one downlink subframe and one special subframe, and transmits a synchronization signal on the special subframe, so that a small cell device that detects the synchronization signal can keep synchronous with the small cell device that transmits the uplink subframe. However, in a process of transmitting the uplink subframe, the small cell device needs to always periodically retain a configuration of one downlink subframe and one special subframe. Therefore, configuration flexibility of a transmission manner of the downlink subframe and the special subframe is sacrificed, and valuable transmission resources are wasted.

SUMMARY

Embodiments of the present invention provide a synchronization signal sending method and apparatus and a synchronization signal receiving method and apparatus. An idle period during data transmission over a backhaul between small cell devices is eliminated, and therefore, configuration flexibility of a subframe is maintained.

A first aspect provides a synchronization signal sending apparatus, where the synchronization signal sending apparatus is disposed in a first node, and the synchronization signal sending apparatus includes:

a sending module, configured to send a first-type subframe, where the first-type subframe includes a physical downlink shared channel PDSCH and a first synchronization channel, the first synchronization channel includes a first primary synchronization signal PSS and a first secondary synchronization signal SSS, and the first PSS and the first SSS are used to enable a second node that receives the first PSS and the first SSS to synchronize with the first node; and a processing module, configured to control the sending module to switch from sending the first-type subframe to sending a second-type subframe; where the sending module is further configured to send the second-type subframe under the control of the processing module, where the second-type subframe includes a physical uplink shared channel PUSCH and a second synchronization channel, the second synchronization channel includes a second PSS or a second SSS, the second PSS or the second SSS is used to enable the second node that receives the second PSS or the second SSS to keep synchronous with the first node, the second PSS is generated according to the first PSS, and the second SSS is generated according to the first SSS.

With reference to the first aspect, in a first possible implementation manner of the first aspect, the sending module is specifically configured to send the first-type subframe, where the first-type subframe includes the PDSCH and the first synchronization channel, and the first synchronization channel is periodically located in the first-type subframe; and send the second-type subframe, where the second-type subframe includes the PUSCH and the second synchronization channel, and the second synchronization channel is periodically located in the second-type subframe.

With reference to the first aspect or the first possible implementation manner of the first aspect, in a second possible implementation manner of the first aspect, the processing module is further configured to generate the second PSS according to the following rule: a sequence, a modulation and coding format, and a frequency domain resource location that are used by the second PSS are consistent with those used by the first PSS; and generate the first PSS according to the following rule: a sequence, a modulation and coding format, and a frequency domain resource location that are used by the second SSS are consistent with those used by the first SSS.

With reference to any one of the first aspect to the second possible implementation manner of the first aspect, in a third possible implementation manner of the first aspect, if the second-type subframe is transmitted in a TDD manner, the second PSS or the second SSS is located in an UwPTS symbol of the second-type subframe.

With reference to any one of the first aspect to the second possible implementation manner of the first aspect, in a fourth possible implementation manner of the first aspect, if the second-type subframe is transmitted in an FDD manner, the second PSS or the second SSS is located in the last symbol of the second-type subframe.

A second aspect provides a synchronization signal receiving apparatus, where the synchronization signal receiving apparatus is disposed in a second node, and the synchronization signal receiving apparatus includes:

a receiving module, configured to receive a first primary synchronization signal PSS and a first secondary synchronization signal SSS, where the first PSS and the first SSS are located in a first-type subframe sent by a first node, the first-type subframe includes a physical downlink shared channel PDSCH and a first synchronization channel, and the first synchronization channel includes the first PSS and the first SSS; and a processing module, configured to synchronize with the first node according to the first PSS and the first SSS; where the receiving module is further configured to receive a second PSS or a second SSS, where the second PSS or the second SSS is located in a second-type subframe sent after the first node switches from sending the first-type subframe to sending the second-type subframe, the second-type subframe includes a physical uplink shared channel PUSCH and a second synchronization channel, the second synchronization channel includes the second PSS or the second SSS, the second PSS is generated according to the first PSS, and the second SSS is generated according to the first SSS; and the processing module is further configured to keep synchronous with the first node according to the second PSS or the second SSS.

With reference to the second aspect, in a first possible implementation manner of the second aspect, the receiving module is specifically configured to receive the first PSS and the first SSS, where the first PSS and the first SSS are located in the first-type subframe sent by the first node, the first-type subframe includes the PDSCH and the first synchronization channel, the first synchronization channel is periodically located in the first-type subframe, and the first synchronization channel includes the first PSS and the first SSS; and receive the second PSS or the second SSS, where the second PSS or the second SSS is located in the second-type subframe sent after the first node switches from sending the first-type subframe to sending the second-type subframe, the second-type subframe includes the PUSCH and the second synchronization channel, the second synchronization channel is periodically located in the second-type subframe, and the second synchronization channel includes the second PSS or the second SSS.

With reference to the second aspect or the first possible implementation manner of the second aspect, in a second possible implementation manner of the second aspect, a sequence, a modulation and coding format, and a frequency domain resource location that are used by the second PSS are consistent with those used by the first PSS, and a sequence, a modulation and coding format, and a frequency domain resource location that are used by the second SSS are consistent with those used by the first SSS.

With reference to any one of the second aspect to the second possible implementation manner of the second aspect, in a third possible implementation manner of the second aspect, the processing module is further configured to extract the second PSS or the second SSS from the second-type subframe before keeping synchronous with the first node according to the second PSS or the second SSS.

With reference to the third possible implementation manner of the second aspect, in a fourth possible implementation manner of the second aspect, if the first-type subframe is transmitted in a TDD manner, and the second-type subframe is also transmitted in the TDD manner, the processing module is specifically configured to extract the second PSS or the second SSS from the second-type subframe when a cycle for obtaining the first SSS is delayed one TTI, where the second PSS or the second SSS is located in an UwPTS symbol of the second-type subframe.

With reference to the third possible implementation manner of the second aspect, in a fifth possible implementation manner of the second aspect, if the first-type subframe is transmitted in an FDD manner, and the second-type subframe is also transmitted in the FDD manner, the processing module is specifically configured to extract the second PSS or the second SSS from the second-type subframe when a cycle for obtaining the first PSS is delayed 0.5 TTI, where the second PSS or the second SSS is located in the last symbol of the second-type subframe.

With reference to the third possible implementation manner of the second aspect, in a sixth possible implementation manner of the second aspect, if the first-type subframe is transmitted in a TDD manner, and the second-type subframe is transmitted in an FDD manner, the processing module is specifically configured to extract the second PSS or the second SSS from the second-type subframe within a cycle for obtaining the first SSS, where the second PSS or the second SSS is located in the last symbol of the second-type subframe.

With reference to any one of the third to the sixth possible implementation manners of the second aspect, in a seventh possible implementation manner of the second aspect, the processing module is further configured to: if only the second PSS or the second SSS is extracted after extracting the second PSS or the second SSS from the second-type subframe, determine that a transmission manner of the first node is switched.

A third aspect provides a synchronization signal sending method, including:

sending, by a first node, a first-type subframe, where the first-type subframe includes a physical downlink shared channel PDSCH and a first synchronization channel, the first synchronization channel includes a first primary synchronization signal PSS and a first secondary synchronization signal SSS, and the first PSS and the first SSS are used to enable a second node that receives the first PSS and the first SSS to synchronize with the first node;

switching, by the first node, from sending the first-type subframe to sending a second-type subframe; and sending, by the first node, the second-type subframe, where the second-type subframe includes a physical uplink shared channel PUSCH and a second synchronization channel, the second synchronization channel includes a second PSS or a second SSS, the second PSS or the second SSS is used to enable the second node that receives the second PSS or the second SSS to keep synchronous with the first node, the second PSS is generated according to the first PSS, and the second SSS is generated according to the first SSS.

With reference to the third aspect, in a first possible implementation manner of the third aspect, the first synchronization channel is periodically located in the first-type subframe, and the second synchronization channel is periodically located in the second-type subframe.

With reference to the third aspect or the first possible implementation manner of the third aspect, in a second possible implementation manner of the third aspect, a sequence, a modulation and coding format, and a frequency domain resource location that are used by the second PSS are consistent with those used by the first PSS, and a sequence, and a modulation and coding format, and a frequency domain resource location that are used by the second SSS are consistent with those used by the first SSS.

With reference to any one of the third aspect to the second possible implementation manner of the third aspect, in a third possible implementation manner of the third aspect, if the second-type subframe is transmitted in a TDD manner, the second PSS or the second SSS is located in an UwPTS symbol of the second-type subframe.

With reference to any one of the third aspect to the second possible implementation manner of the third aspect, in a fourth possible implementation manner of the third aspect, if the second-type subframe is transmitted in an FDD manner, the second PSS or the second SSS is located in the last symbol of the second-type subframe.

A fourth aspect provides a synchronization signal receiving method, including:

receiving, by a second node, a first PSS and a first SSS, where the first PSS and the first SSS are located in a first-type subframe sent by a first node, the first-type subframe includes a PDSCH and a first synchronization channel, and the first synchronization channel includes the first PSS and the first SSS;

synchronizing, by the second node, with the first node according to the first PSS and the first SSS;

receiving, by the second node, a second PSS or a second SSS, where the second PSS or the second SSS is located in a second-type subframe sent after the first node switches from sending the first-type subframe to sending the second-type subframe, the second-type subframe includes a PUSCH and a second synchronization channel, the second synchronization channel includes the second PSS or the second SSS, the second PSS is generated according to the first PSS, and the second SSS is generated according to the first SSS; and keeping, by the second node, synchronous with the first node according to the second PSS or the second SSS.

With reference to the fourth aspect, in a first possible implementation manner of the fourth aspect, the first synchronization channel is periodically located in the first-type subframe, and the second synchronization channel is periodically located in the second-type subframe.

With reference to the fourth aspect or the first possible implementation manner of the fourth aspect, in a second possible implementation manner of the fourth aspect, a sequence, a modulation and coding format, and a frequency domain resource location that are used by the second PSS are consistent with those used by the first PSS, and a sequence, a modulation and coding format, and a frequency domain resource location that are used by the second SSS are consistent with those used by the first SSS.

With reference to any one of the fourth aspect to the second possible implementation manner of the fourth aspect, in a third possible implementation manner of the fourth aspect, before the keeping, by the second node, synchronous with the first node according to the second PSS or the second SSS, the method further includes:

extracting, by the second node, the second PSS or the second SSS from the second-type subframe.

With reference to the third possible implementation manner of the fourth aspect, in a fourth possible implementation manner of the fourth aspect, if the first-type subframe is transmitted in a TDD manner, and the second-type subframe is also transmitted in the TDD manner, the extracting, by the second node, the second PSS or the second SSS from the second-type subframe includes:

extracting, by the second node, the second PSS or the second SSS from the second-type subframe when a cycle for obtaining the first SSS is delayed one TTI, where the second PSS or the second SSS is located in an UwPTS symbol of the second-type subframe.

With reference to the third possible implementation manner of the fourth aspect, in a fifth possible implementation manner of the fourth aspect, if the first-type subframe is transmitted in an FDD manner, and the second-type subframe is also transmitted in the FDD manner, the extracting, by the second node, the second PSS or the second SSS from the second-type subframe includes:

extracting, by the second node, the second PSS or the second SSS from the second-type subframe when a cycle for obtaining the first PSS is delayed 0.5 TTI, where the second PSS or the second SSS is located in the last symbol of the second-type subframe.

With reference to the third possible implementation manner of the fourth aspect, in a sixth possible implementation manner of the fourth aspect, if the first-type subframe is transmitted in a TDD manner, and the second-type subframe is transmitted in an FDD manner, the extracting, by the second node, the second PSS or the second SSS from the second-type subframe includes:

extracting, by the second node, the second PSS or the second SSS from the second-type subframe within a cycle for obtaining the first SSS, where the second PSS or the second SSS is located in the last symbol of the second-type subframe.

With reference to any one of the third to the sixth possible implementation manners of the fourth aspect, in a seventh possible implementation manner of the fourth aspect, after the extracting, by the second node, the second PSS or the second SSS from the second-type subframe, the method further includes:

if the second node receives only the second PSS or the second SSS, determining, by the second node, that a transmission manner of the first node is switched.

According to the synchronization signal sending method and apparatus and the synchronization signal receiving method and apparatus provided in the embodiments of the present invention, a first node sends a second PSS or a second SSS when sending a PUSCH, to enable a second node within a coverage area of the first node to still keep synchronous with the first node when a transmission status of the first node is switched. In addition, the second PSS or the second SSS is located in a PUSCH subframe, and there is no need to configure a fixed PDSCH subframe and a fixed special subframe for the second PSS or the second SSS. Therefore, an idle period during data transmission over a backhaul between small cell devices is eliminated, and configuration flexibility of some subframes is maintained.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 9A is a schematic diagram of a frame structure in which a first-type subframe is transmitted in a TDD manner, a second-type subframe is transmitted in an FDD manner, and the second-type subframe includes a second SSS;

FIG. 9B is a schematic diagram of a frame structure in which a first-type subframe is transmitted in a TDD manner, a second-type subframe is transmitted in an FDD manner, and the second-type subframe includes a second PSS;

FIG. 10 is a flowchart of a first embodiment of a synchronization signal sending method according to an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
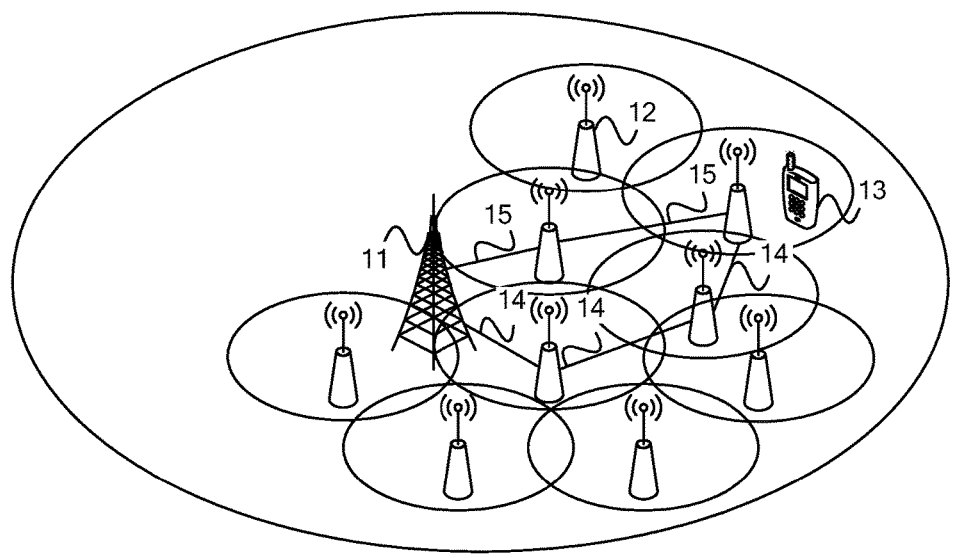
FIG. 1 is a schematic diagram of a network architecture of densely deployed small cell devices in a heterogeneous network architecture.

FIG. 1 is a schematic diagram of a network architecture of densely deployed small cell devices in a heterogeneous network architecture. As shown in FIG. 1, there are multiple small cell devices 12 within a coverage area of a macro base station 11, and each small cell device 12 has a coverage area. UE 13 may access a network by using any small cell device 12 or the macro base station 11. A backhaul of a small cell device 12 accessed by the UE 13 is a data transmission path from the small cell device 12 accessed by the UE 13 to the macro base station. The backhaul from the small cell device 12 to the macro base station 11 varies with a network status at any time. For example, the small cell device 12 accessed by the UE 13 may transmit data according to a path 14, or may transmit data according to a path 15. That is, the backhaul of the small cell device 12 accessed by the UE 13 may be the path 14, or may be the path 15.

In addition, each small cell device 12 in the network has two data transmission manners, which are respectively sending a physical uplink shared channel (Physical Uplink Shared Channel, PUSCH) and sending a physical downlink shared channel (Physical Downlink Shared Channel, PDSCH). A small cell device 12 chooses a different data transmission manner according to a different configuration or a different application environment of the small cell device 12. For example, if the small cell device 12 is accessed by UE, the small cell device 12 can send only the PDSCH.

Therefore, in addition to a path change, a small cell device 12 on a data backhaul path may encounter a transmission manner change.

When sending a PDSCH, a first small cell device further sends a synchronization channel in a same subframe, and the synchronization channel appears periodically. The synchronization channel includes a primary synchronization signal (Primary Synchronization Signal, PSS) and a secondary synchronization signal (Secondary Synchronization Signal, SSS), and the PSS and the SSS are broadcast signals. Other small cell devices located within a coverage area of the first small cell device can detect the PSS and the SSS, and synchronize with the first small cell device according to the PSS and the SSS.

However, the first small cell device does not send a synchronization channel in a same subframe when sending a PUSCH; therefore, when the first small cell device switches from sending the PUSCH to sending the PDSCH, other small cell devices in the network can receive data on the PDSCH only after first detecting the PSS and the SSS that are sent at the same time as the PDSCH and synchronizing with the first small cell device. The other small cell devices need a specific period of time for detecting the PSS and the SSS and completing synchronization with the first small cell device, and the first small cell device cannot transmit data during this period of time; therefore, some transmission resources are wasted.

Figure 2:
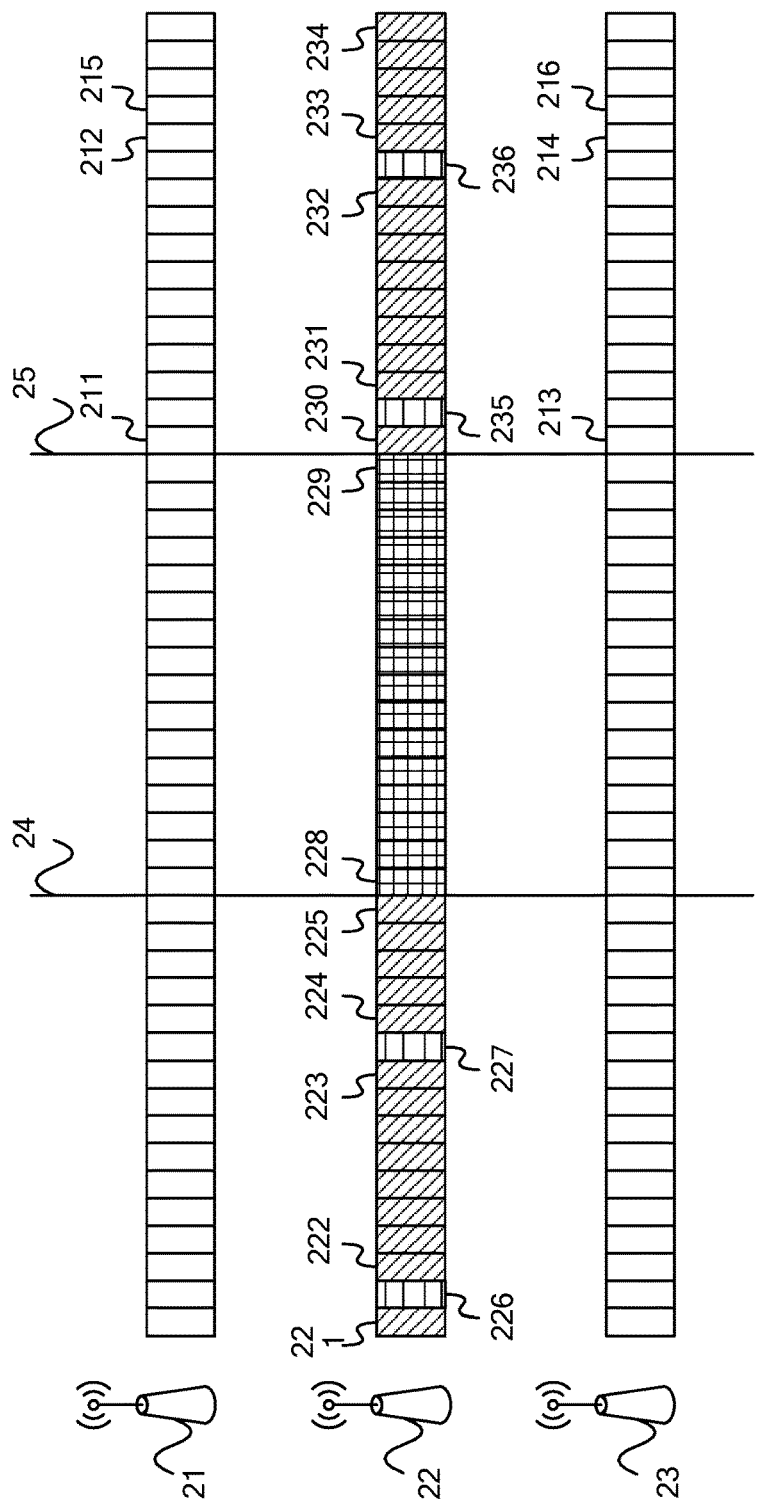
FIG. 2 is a schematic diagram of resource transmission between small cell devices.

FIG. 2 is a schematic diagram of resource transmission between small cell devices. As shown in FIG. 2, there are three small cell devices, an SC 21, an SC 22 and an SC 23 in a network. A time point 24 and a time point 25 are switching points for changing a transmission manner. Before the time point 24, the SC 22 sends data to the SC 23 by using a downlink subframe. Each of a subframe 221, a subframe 222 to a subframe 223, and a subframe 224 to a subframe 225 includes a PDSCH, a subframe 226 and a subframe 227 are special subframes, and a special subframe is periodically configured in a downlink subframe. Each downlink subframe sent by the SC 22 before the time point 24 periodically includes a synchronization signal. The synchronization signal is a broadcast signal, and the synchronization signal includes a PSS and an SSS, where the PSS is located in a special subframe, and the SSS is located in a PDSCH subframe preceding the special subframe. Both the SC 21 and the SC 23 within a coverage area of the SC 22 can detect the synchronization signal, so that both the SC 21 and the SC 23 can synchronize with the SC 22 before the time point 24. Starting from the time point 24, the SC 22 switches to send data to the SC 23 by using an uplink subframe, where each of a subframe 228 to a subframe 229 includes a PUSCH. In a current frame format, the SC 22 does not include a synchronization signal when sending a subframe that includes a PUSCH. Therefore, starting from the time point 24, the SC 21 and the SC 23 cannot detect the synchronization signal sent by the SC 22, that is, the SC 21 and the SC 23 will lose synchronization with the SC 22. Starting from the time point 25, the SC 22 switches to send data to the SC 21 or the SC 23 by using a downlink subframe again. In this case, each of a subframe 230, a subframe 231 to a subframe 232, and a subframe 233 to a subframe 234 includes a PDSCH, and a subframe 235 and a subframe 236 are special subframes. However, within a period of time from the time point 24 to the time point 25, each uplink subframe sent by the SC 22 does not have a synchronization signal. Therefore, after the time point 25, a period of time from a subframe 211 to a subframe 212 received by the SC 21 needs to be used to detect a synchronization signal (PSS and SSS) on a PDSCH sent by the SC 22, and synchronize with the SC 22 according to the synchronization signal. Likewise, a period of time from a subframe 213 to a subframe 214 received by the SC 23 needs to be used to detect the synchronization signal (PSS and SSS) on the PDSCH sent by the SC 22, and synchronize with the SC 22 according to the synchronization signal. Only starting from a subframe 215, the SC 21 can start to receive data carried by a PDSCH subframe sent by the SC 22, or likewise, only starting from a subframe 216, the SC 23 can start to receive data carried by the PDSCH subframe sent by the SC 22. The subframe 211 to the subframe 212 of the SC 21 and the subframe 213 to the subframe 214 of the SC 23 become an idle period during data transmission over a backhaul between small cell devices, and the idle period generally has dozens of milliseconds to hundreds of milliseconds. It can be learned that, after a transmission manner is switched, a data receive end may need a specific period of time to synchronize with a data transmit end, and then the receive end and the transmit end can perform data transmission. Therefore, data transmission may be delayed, and transmission resources are wasted.

Figure 3:
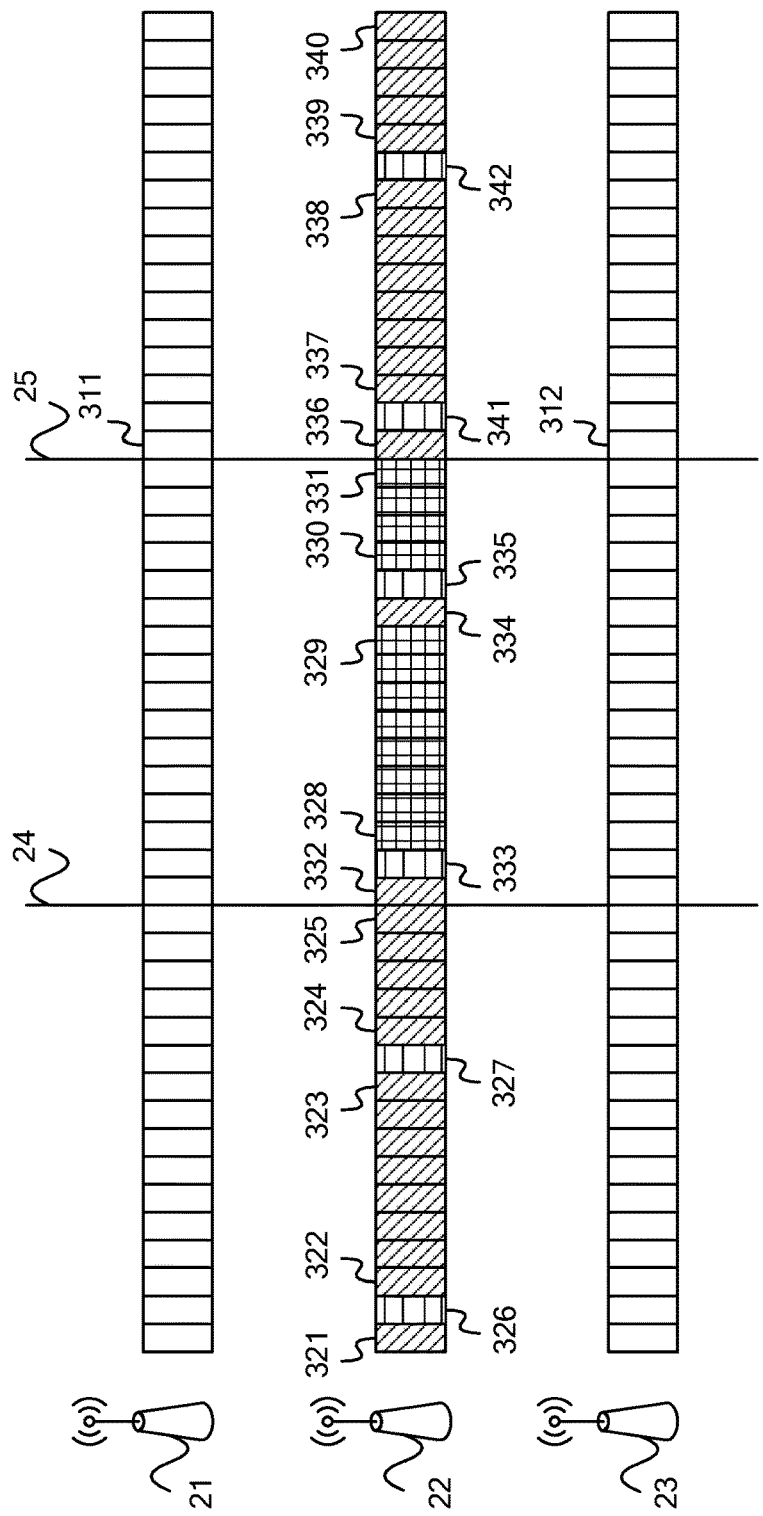
FIG. 3 is a schematic diagram of resource transmission between small cell devices when a Relay technology is used.

When a Relay technology is used, there is a method for eliminating the foregoing delay generated during data transmission over a backhaul between small cell devices. FIG. 3 is a schematic diagram of resource transmission between small cell devices when the Relay technology is used. As shown in FIG. 3, there are three small cell devices, an SC 21, an SC 22, and an SC 23 in a network. A time point 24 and a time point 25 are switching points for changing a transmission manner. Before the time point 24, the SC 22 sends data to the SC 23 by using a downlink subframe. Each of a subframe 321, a subframe 322 to a subframe 323, and a subframe 324 to a subframe 325 includes a PDSCH, a subframe 326 and a subframe 327 are special subframes, and a special subframe is periodically configured in a downlink subframe. Each subframe sent by the SC 22 before the time point 24 periodically includes a synchronization signal. The synchronization signal is a broadcast signal, and the synchronization signal includes a PSS and an SSS, where the PSS is located in a special subframe, and the SSS is located in a PDSCH subframe preceding the special subframe. Both the SC 21 and the SC 23 within a coverage area of the SC 22 can detect the synchronization signal, so that both the SC 21 and the SC 23 can synchronize with the SC 22 before the time point 24. Starting from the time point 24, the SC 22 switches to send data to the SC 23 by using an uplink subframe, and each of a subframe 328 to a subframe 329, and a subframe 330 to a subframe 331 includes a PDSCH. A difference from FIG. 2 lies in that, staring from the time point 24, a subframe 332 includes a PDSCH, a subframe 333 is a special subframe, a subframe 334 includes a PDSCH, and a subframe 335 is a special subframe. The subframe 332 and the subframe 333, and the subframe 334 and the subframe 335 are periodically configured in an uplink subframe. In addition, the subframe 332 and the subframe 333, and the subframe 334 and the subframe 335 are only used to enable the SC 22 to send a synchronization signal. Starting from the time point 25, the SC 22 switches to send data to the SC 21 or the SC 23 by using a downlink subframe again. In this case, each of a subframe 336, a subframe 337 to a subframe 338, and a subframe 339 to a subframe 340 includes a PDSCH, and a subframe 341 and a subframe 342 are special subframes. Within a period of time from the time point 24 to the time point 25, the subframe 332 and the subframe 334 that include a PDSCH, and the subframe 333 and the subframe 335 that are in a special subframe format are included. Therefore, within the period of time from the time point 24 to the time point 25, the SC 21 and the SC 23 can also detect the synchronization signal sent by the SC 22, and synchronize with the SC 22 according to the synchronization signal. Therefore, after the time point 25, the SC 21 can receive, starting from the subframe 311, the subframe 336 sent by the SC 22, or the SC 23 can receive, starting from the subframe 312, the subframe 336 sent by the SC 22. In this way, the idle period shown in FIG. 2 is avoided, thereby resolving a delay problem during data transmission over a backhaul between small cell devices.

However, in the method shown in FIG. 3, the SC 22 periodically sends a downlink subframe and a special subframe during a process of sending an uplink subframe that includes a PUSCH, where the downlink subframe includes a PDSCH, and the downlink subframe and the special subframe are only used to send a synchronization signal. Therefore, although synchronization between other SCs and the SC 22 is implemented, configuration flexibility of subframes in which the downlink subframe and the special subframe are located is sacrificed by inserting the downlink subframe that includes a PDSCH and inserting the special subframe into the uplink subframe that includes a PUSCH, and valuable transmission resources are wasted. It should be noted that, in FIG. 3, a time division duplex (Time Division Duplex, TDD) system is used as an example for description. For a frequency division duplex (Frequency Division Duplex, FDD) system, a difference lies in that the system has a different frame format; however, the foregoing problem still exists.

Figure 4:
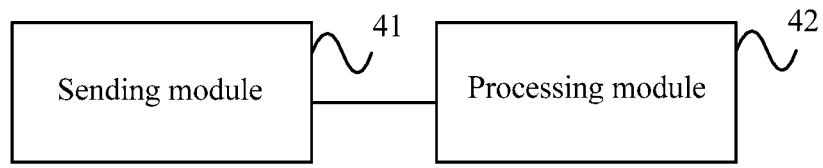
FIG. 4 is a schematic structural diagram of a first embodiment of a synchronization signal sending apparatus according to an embodiment of the present invention.

FIG. 4 is a schematic structural diagram of a first embodiment of a synchronization signal sending apparatus according to an embodiment of the present invention. As shown in FIG. 4, the apparatus in this embodiment includes:

A sending module 41, configured to send a first-type subframe, where the first-type subframe includes a PDSCH and a first synchronization channel, the first synchronization channel includes a first PSS and a first SSS, and the first PSS and the first SSS are used to enable a second node that receives the first PSS and the first SSS to synchronize with a first node.

Specifically, to resolve the foregoing problem, in this embodiment of the present invention, during data transmission between small cell devices over a backhaul, a synchronization signal that only exists in a downlink subframe is added when a small cell device that sends data is sending an uplink subframe, so that the small cell device that sends data can always send a synchronization signal when a transmission status is changed.

The synchronization signal sending apparatus provided in this embodiment is disposed in a first node that sends data. Any network node that can send data in a heterogeneous network architecture is referred to as a first node. Within a coverage area of the first node, any network node that can detect a synchronization signal sent by the first node is referred to as a second code. A target node to which the first node sends data is one second node.

Figure 5A:
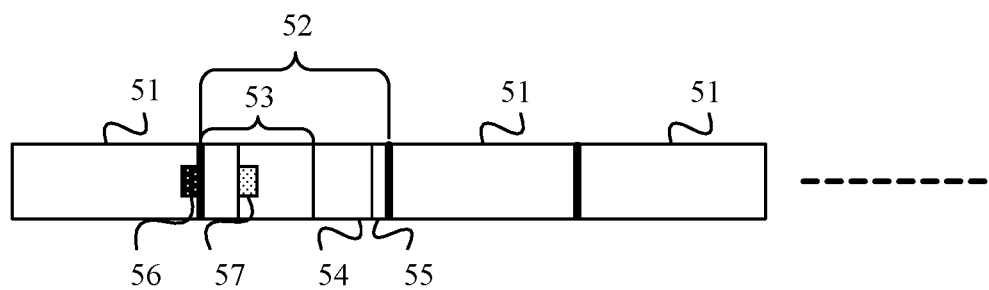
FIG. 5A is a schematic diagram of a frame structure of a first-type subframe in a TDD system.
Figure 5B:
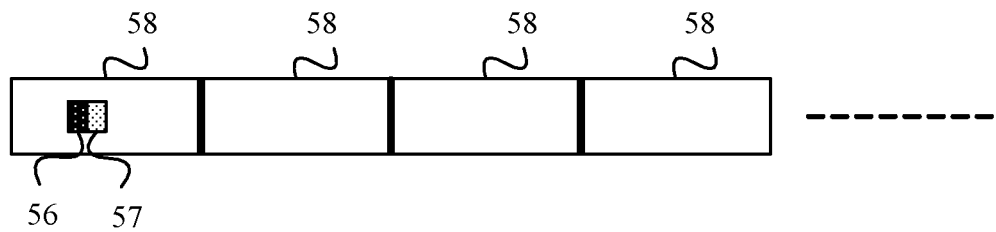
FIG. 5B is a schematic diagram of a frame structure of a first-type subframe in an FDD system.

Subframes sent by the first node may be classified into two types, a first-type subframe and a second-type subframe. The first-type subframe herein includes a PDSCH and a first synchronization channel, and the first synchronization channel is periodically located in the first-type subframe. For a TDD system and an FDD system, frame structures of the first-type subframe are different. FIG. 5A is a schematic diagram of the frame structure of the first-type subframe in the TDD system. FIG. 5B is a schematic diagram of the frame structure of the first-type subframe in the FDD system. As shown in FIG. 5A, the first-type subframe includes multiple PDSCH subframes 51 and a special subframe 52, where the special subframe 52 includes a downlink pilot timeslot (Downlink Pilot Timeslot, DwPTS) 53, a guard period (Guard Period, GP) 54, and an uplink pilot timeslot (Uplink Pilot Timeslot, UwPTS) 55, and the special subframe 52 periodically appears in the first-type subframe. The last symbol of a PDSCH subframe 51 preceding the special subframe 52 includes a first SSS 56, and the DwPTS 53 of the special subframe 52 includes a first PSS 57. The first SSS 56 and the first PSS 57 constitute a first synchronization channel of the first-type subframe. As shown in FIG. 5B, the first-type subframe includes multiple PDSCH subframes 58, where some PDSCH subframes of the multiple PDSCH subframes 58 include a first SSS 56 and a first PSS 57. A PDSCH subframe that includes a first SSS 56 and a first PSS 57 periodically appears in the first-type subframe, and the PDSCH subframe 58 includes 14 symbols, where the first SSS 56 is located in the sixth symbol, and the first PSS 57 is located in the seventh symbol.

The synchronization signal sending apparatus provided in this embodiment of the present invention includes the sending module 41. The sending module 41 is configured to send a first-type subframe, and the sending module 41 sends the first-type subframe to a second node within the coverage area of the first node according to needs of a backhaul path. Another second node within the coverage area of the first node can detect a synchronization channel of the first-type subframe sent by the sending module 41. After the second node detects the synchronization channel of the first-type subframe and receives a first SSS and a first PSS of the synchronization channel, the second node can synchronize with the first node according to the first SSS and the first PSS.

It should be noted that, the first synchronization channel of the first-type subframe does not exist in all subframes of the first-type subframe, but appears periodically.

A processing module 42, configured to control the sending module 41 to switch from sending the first-type subframe to sending a second-type subframe.

Specifically, the synchronization signal sending apparatus provided in this embodiment further includes the processing module 42. The processing module 42 is configured to control the sending module 41 to switch from sending the first-type subframe to sending the second-type subframe. Optionally, the processing module 42 may determine, by detecting a preset configuration of the synchronization signal sending apparatus, whether to switch from sending the first-type subframe to sending the second-type subframe, or the processing module 42 may determine, by detecting an external environment of the first node in which the synchronization signal sending apparatus is located, whether to switch from sending the first-type subframe to sending the second-type subframe. In conclusion, the synchronization signal sending apparatus includes two sending states, which are respectively sending the first-type subframe and sending the second-type subframe, and the processing module 42 determines to use which sending state by detecting an internal state or an external state of the synchronization signal sending apparatus.

The sending module 41 is further configured to send the second-type subframe under the control of the processing module 42. The second-type subframe includes a PUSCH and a second synchronization channel, where the second synchronization channel includes a second PSS or a second SSS, the second PSS or the second SSS is used to enable a second node that receives the second PSS or the second SSS to synchronize with the first node, the second PSS is generated according to the first PSS, and the second SSS is generated according to the first SSS.

Specifically, the sending module 41 is further configured to send the second-type subframe, where the second-type subframe is sent to any second node. The second-type subframe includes the PUSCH and the second synchronization channel, where the second synchronization channel includes the second PSS or the second SSS. The second PSS is generated according to the first PSS, and the second SSS is generated according to the first SSS. That is, the second-type subframe includes either the second PSS or the second SSS, the second PSS is generated according to the first PSS of the first-type subframe, and the second SSS is generated according to the first SSS of the first-type subframe.

For the TDD system and the FDD system, frame structures of the second-type subframe are different. However, both the frame structures periodically include one of the second PSS or the second SSS. The second PSS or the second SSS may be periodically located at any location in the second-type subframe, and the location at which the second PSS or the second SSS is located in the second-type subframe is predefined in the first node and the second node. The second PSS and the second SSS are respectively generated according to the first PSS and the first SSS. Therefore, the second PSS or the second SSS is also a broadcast signal. Among second nodes within the coverage area of the first node, another second node except a second node that receives the second-type subframe can detect the second PSS or the second SSS of the second-type subframe. When a transmission manner of the first node is switched from sending a first-type subframe that includes a PDSCH to sending a second-type subframe that includes a PUSCH, the second node still first detects a synchronization channel within a cycle for detecting the first PSS and the first SSS. If not detected, the second node detects the second PSS or the second SSS within a cycle of the second PSS or the second SSS, where the cycle is predefined by the first node and the second node, so that the second PSS or the second SSS can be detected. The second synchronization channel of the second-type subframe includes the second PSS or the second SSS, that is, the second synchronization channel is different from the first synchronization channel because the second synchronization channel includes either the second PSS or the second SSS, but not a complete synchronization signal. However, before receiving the second-type subframe, the second node first receives the first-type subframe, and synchronizes with the first node according to the first synchronization channel of the first-type subframe. Because the second PSS and the second SSS are respectively generated according to the first PSS and the first SSS, after obtaining the second PSS or the second SSS, the second node can determine that the second PSS or the second SSS is still sent by the first node that sends the first PSS and the first SSS, so that the second node can keep synchronous with the first node according to the second PSS or the second SSS. In addition, because the second synchronization channel of the second-type subframe includes the second PSS or the second SSS, resources occupied by the second synchronization channel in the second-type subframe can be reduced, and there is no need to add a PDSCH subframe and a special subframe when a PUSCH subframe is being sent. Therefore, all subframes can be flexibly configured when the synchronization signal sending apparatus sends the PUSCH subframe.

It should be noted that, the second synchronization channel of the second-type subframe does not exist in all subframes of the second-type subframe, but appears periodically.

After the sending module 41 sends the second-type subframe, if the processing module 42 switches to send the first-type subframe again, because the second node is always keeping synchronous with the first node, the second node that receives the first-type subframe can directly receive data sent by the first node without a need to wait for the first PSS and the first SSS of the first-type subframe to synchronize with the first node, and the first node can directly send data without a need to wait for the second node to perform synchronization. Therefore, an idle period during data transmission over a backhaul between small cell devices is eliminated.

Because the second PSS is generated according to the first PSS, and the second SSS is generated according to the first SSS, the second PSS and the first PSS have some same features, and the second SSS and the first SSS have some same features. The second node that receives the second PSS or the second SSS can keep synchronous with the first node according to features of the first PSS or the first SSS, so that there is no need to reconstruct a new synchronization signal synchronization mechanism between the first node and the second node.

Further, to enable the second node to better keep synchronous with the first node, the processing module 42 may generate the second PSS according to the following rule: a sequence, a modulation and coding format, and a frequency domain resource location that are used by the second PSS are consistent with those used by the first PSS; and may generate the second SSS according to the following rule: a sequence, a modulation and coding format, and a frequency domain resource location that are used by the second SSS are consistent with those used by the first SSS. Compared with the first PSS and the first SSS, the second PSS and the second SSS are located in different timeslots in the second-type subframe and the first-type subframe. When the sending module 41 sends the first-type subframe, the first PSS and the first SSS of the first synchronization channel are sent periodically, so that the second node can detect the first PSS and the first SSS within a corresponding cycle. However, when the sending module 41 sends the second-type subframe according to the foregoing rules, the second node can detect the second PSS or the second SSS, provided that a time offset is added to a cycle for detecting the first PSS and the second SSS. Except the time offset, the second PSS and the second SSS are the same as the first PSS and the first SSS. Therefore, there is no need to further configure another group of synchronization signals in the second node. That is, the second PSS or the second SSS is further detected within one time interval following the cycle for detecting the first PSS and the first SSS.

In this embodiment, a first node sends a second PSS or a second SSS when sending a PUSCH, so as to enable a second node within a coverage area of the first node to still keep synchronous with the first node when a transmission status of the first node is switched. In addition, the second PSS or the second SSS is located in the PUSCH, and there is no need to configure a fixed PDSCH subframe and a fixed special subframe for the second PSS or the second SSS. Therefore, an idle period during data transmission over a backhaul between small cell devices is eliminated, and configuration flexibility of some subframes is maintained.

Further, the second-type subframe may be transmitted in a TDD manner or an FDD manner. Because frame structures of the second-type subframe in the TDD system and the FDD system are different, locations of the second PSS or the second SSS are different in the second-type subframe.

If the second-type subframe is transmitted in the TDD manner, the second PSS or the second SSS may be placed in an UwPTS symbol preceding some subframes of the second-type subframe. If the second-type subframe is transmitted in the FDD manner, the second PSS or the second SSS may be placed in the last symbol of a subframe or some subframes of the second-type subframe. If the second PSS or the second SSS periodically appears in the second-type subframe, and the first PSS and the first SSS periodically appear in the first-type subframe, a cycle of the second PSS or the second SSS is the same as a cycle of the first PSS or the first SSS. The second PSS or the second SSS configured according to the foregoing rules can enable the second node to detect a second PSS or a second SSS according to one time offset. A specific method for detecting the second PSS or the second SSS by the second node is described in detail in the following embodiments.

Figure 6:
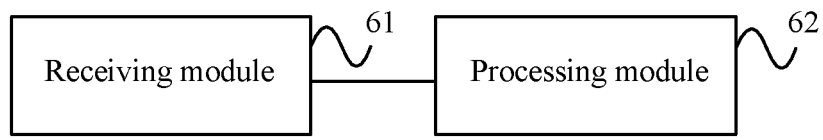
FIG. 6 is a schematic structural diagram of a first embodiment of a synchronization signal receiving apparatus according to an embodiment of the present invention.

FIG. 6 is a schematic structural diagram of a first embodiment of a synchronization signal receiving apparatus according to an embodiment of the present invention. As shown in FIG. 6, the apparatus in this embodiment includes:

A receiving module 61, configured to receive a first PSS and a first SSS, where the first PSS and the first SSS are located in a first-type subframe sent by a first node, the first-type subframe includes a PDSCH and a first synchronization channel, and the first synchronization channel includes the first PSS and the first SSS.

Specifically, the synchronization signal receiving apparatus provided in this embodiment is disposed in a second node of a network. The second node is located within a coverage area of the first node that sends data, and can detect a synchronization signal sent by the first node.

The synchronization signal receiving apparatus provided in this embodiment of the present invention includes the receiving module 61. The receiving module 61 is configured to receive the first PSS and the first SSS, where the first PSS and the first SSS are located in the first-type subframe sent by the first node, the first-type subframe includes the PDSCH and the first synchronization channel, and the first synchronization channel includes the first PSS and the first SSS. The first-type subframe sent by the first node is sent to one second node of multiple second nodes that are located within the coverage area of the first node. However, another node within the coverage area of the first node can also detect the first PSS and the first SSS of the first-type subframe.

It should be noted that, the first synchronization channel of the first-type subframe does not exist in all subframes of the first-type subframe, but appears periodically.

A processing module 62, configured to synchronize with the first node according to the first PSS and the first SSS.

Specifically, the synchronization signal receiving apparatus provided in this embodiment of the present invention further includes a processing module 62. After the receiving module 61 receives the first PSS and the first SSS, the processing module 62 can synchronize with the first node according to the first PSS and the first SSS.

The receiving module 61 is further configured to receive a second PSS or a second SSS, where the second PSS or the second SSS is located in a second-type subframe sent after the first node switches from sending the first-type subframe to sending the second-type subframe, the second-type subframe includes a PUSCH and a second synchronization channel, the second synchronization channel includes the second PSS or the second SSS, the second PSS is generated according to the first PSS, and the second SSS is generated according to the first SSS.

Specifically, the receiving module 61 is further configured to receive either the second PSS or the second SSS. The second PSS and the second SSS are located in the second-type subframe sent by the first node, where the second-type subframe includes the PUSCH and the second synchronization channel, the second synchronization channel includes the second PSS or the second SSS, the second PSS is generated according to the first PSS, and the second SSS is generated according to the first SSS. The second-type subframe is sent when a transmission manner of the first node is switched. The second-type subframe sent by the first node is sent to one second node of multiple second nodes within the coverage area of the first node. However, another node within the coverage area of the first node can also detect the second PSS or the second SSS in the second-type subframe.

For a TDD system and an FDD system, frame structures of the second-type subframe are different. However, both the frame structures include either the second PSS or the second SSS. The second PSS or the second SSS may be periodically located at any location in the second-type subframe, and the location at which the second PSS or the second SSS is located in the second-type subframe is predefined in the first node and the second node. The second PSS and the second SSS are respectively generated according to the first PSS and the first SSS. Therefore, the second PSS or the second SSS is also a broadcast signal. Among second nodes within the coverage area of the first node, another second node except the second node that receives the second-type subframe can detect the second PSS or the second SSS in the second-type subframe, and the receiving module 61 receives the second PSS or the second SSS. When a transmission manner of the first node is switched from sending a first-type subframe that includes a PDSCH to sending a second-type subframe that includes a PUSCH, the receiving module 61 still first detects and receives a synchronization channel within a cycle for receiving the first PSS and the first SSS. If not detected, the receiving module 61 detects and receives the second PSS or the second SSS within a cycle of the second PSS or the second SSS, where the cycle is predefined by the first node and the receiving module 61, so that the second PSS or the second SSS can be received. The second synchronization channel of the second-type subframe includes the second PSS or the second SSS, that is, the second synchronization channel is different from the first synchronization channel because the second synchronization channel includes either the second PSS or the second SSS, but not a complete synchronization signal. However, before receiving the second-type subframe, the receiving module 61 first receives the first-type subframe, and the processing module 62 synchronizes with the first node according to the first synchronization channel of the first-type subframe. The second PSS and the second SSS are respectively generated according to the first PSS and the first SSS. Therefore, after the receiving module 61 obtains the second PSS or the second SSS, the processing module 62 can determine that the second PSS or the second SSS is still sent by the first node that sends the first PSS and the first SSS, so that the processing module 62 can still keep synchronous with the first node according to the second PSS or the second SSS. In addition, because the second synchronization channel of the second-type subframe includes the second PSS or the second SSS, resources occupied by the second synchronization channel in the second-type subframe can be reduced, and there is no need to add a PDSCH subframe and a special subframe when a PUSCH subframe is being sent. Therefore, all subframes can be flexibly configured when a synchronization signal sending apparatus sends the PUSCH subframe.

It should be noted that, the second synchronization channel of the second-type subframe does not exist in all subframes of the second-type subframe, but appears periodically.

The processing module 62 is further configured to keep synchronous with the first node according to the second PSS or the second SSS.

Specifically, because the second PSS is generated according to the first PSS, and the second SSS is generated according to the first SSS, the second PSS and the first PSS have some same features, and the second SSS and the first SSS have some same features. After a second receiving module 63 receives the second PSS or the second SSS, the processing module 62 can keep synchronous with the first node according to features of the first PSS or the first SSS, so that there is no need to reconstruct a new synchronization signal synchronization mechanism between the first node and the second node.

Further, to enable the second node to better keep synchronous with the first node, setting rules of the second PSS and the second SSS may be as follows: A sequence, a modulation and coding format, and a frequency domain resource location that are used by the second PSS are consistent with those used by the first PSS, and a sequence, a modulation and coding format, and a frequency domain resource location that are used by the second SSS are consistent with those used by the first SSS. Compared with the first PSS and the first SSS, the second PSS and the second SSS are located in different timeslots in the second-type subframe and the first-type subframe. When the first node sends the first-type subframe, the first PSS and the first SSS of the first synchronization channel are sent periodically, so that the second node can detect the first PSS and the first SSS within a corresponding cycle. However, when the first node sends the second-type subframe according to the foregoing rules, the second node can detect the second PSS or the second SSS, provided that a time offset is added to a cycle for detecting the first PSS and the second SSS. Except the time offset, the second PSS and the second SSS are the same as the first PSS and the first SSS. Therefore, there is no need to further configure another group of synchronization signals in the second node. That is, the second PSS or the second SSS is detected again within one time interval following the cycle for detecting the first PSS and the first SSS.

After the processing module 62 keeps synchronous with the first node according to the second PSS or the second SSS, if the receiving module 61 receives again the first-type subframe sent by the first node, because the second node is always keeping synchronous with the first node, the second node can directly receive data sent by the first node without a need to wait for the first PSS and the first SSS of the first-type subframe to synchronize with the first node, and the first node can directly send data without a need to wait for the second node to perform synchronization. Therefore, an idle period during data transmission over a backhaul between small cell devices is eliminated.

In this embodiment, a first node sends a second PSS or a second SSS when sending a PUSCH, so as to enable a second node within a coverage area of the first node to still keep synchronous with the first node when a transmission status of the first node is switched. In addition, the second PSS or the second SSS is located in the PUSCH, and there is no need to configure a fixed PDSCH subframe and a fixed special subframe for the second PSS or the second SSS. Therefore, an idle period during data transmission over a backhaul between small cell devices is eliminated, and configuration flexibility of some subframes is maintained.

Further, the processing module 62 is further configured to extract the second PSS or the second SSS from the second-type subframe before keeping synchronous with the first node according to the second PSS or the second SSS. Specifically, after detecting the second PSS or the second SSS on the second synchronization channel of the second-type subframe, the processing module 62 further needs to extract the second PSS or the second SSS. Because there may be a time offset between a cycle of the second PSS or the second SSS and a cycle of the first PSS and the first SSS sent by the first node, according to different frame structures of the first-type subframe and the second-type subframe, the processing module 62 needs to extract the second PSS or the second SSS according to different rules.

Specifically, in a TDD system and an FDD system, frame structures of the first-type subframe and the second-type subframe are different, and this is mainly classified into three cases. Case 1: The first-type subframe is transmitted in a TDD manner, and the second-type subframe is also transmitted in the TDD manner. Case 2: The first-type subframe is transmitted in an FDD manner, and the second-type subframe is also transmitted in the FDD manner. Case 3: The first-type subframe is transmitted in a TDD manner, and the second-type subframe is transmitted in an FDD manner.

Figure 7A:
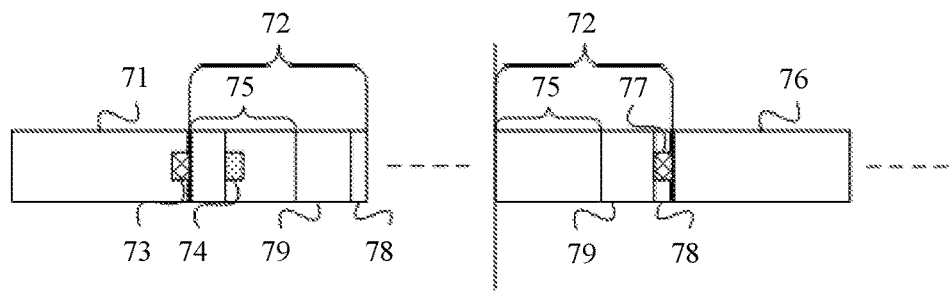
FIG. 7A is a schematic diagram of a frame structure in which a first-type subframe is transmitted in a TDD manner, a second-type subframe is also transmitted in the TDD manner, and the second-type subframe includes a second SSS.
Figure 7B:
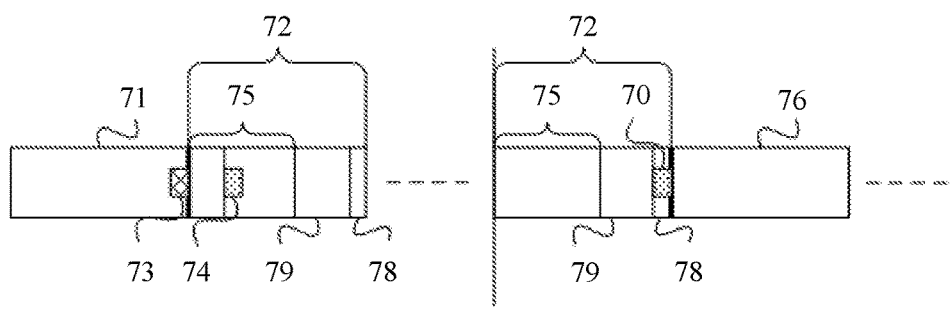
FIG. 7B is a schematic diagram of a frame structure in which a first-type subframe is transmitted in a TDD manner, a second-type subframe is also transmitted in the TDD manner, and the second-type subframe includes a second PSS.

In case 1, that is, the first-type subframe is transmitted in the TDD manner, and the second-type subframe is also transmitted in the TDD manner. The processing module 62 is specifically configured to extract the second PSS or the second SSS from the second-type subframe when a cycle for obtaining the first SSS is delayed one transmission time interval (Transmission Time Interval, TTI), and the second PSS or the second SSS is located in an UwPTS symbol of the second-type subframe. FIG. 7A and FIG. 7B are used as an example for description. FIG. 7A is a schematic diagram of a frame structure in which the first-type subframe is transmitted in the TDD manner, the second-type subframe is also transmitted in the TDD manner, and the second-type subframe includes the second SSS. FIG. 7B is a schematic diagram of a frame structure in which the first-type subframe is transmitted in the TDD manner, the second-type subframe is also transmitted in the TDD manner, and the second-type subframe includes the second PSS.

As shown in FIG. 7A, a first-type subframe includes a PDSCH 71 and a special subframe 72, a first SSS 73 is located in the last symbol of the PDSCH 71 preceding the special subframe 72, and a first PSS 74 is located in a DwPTS 75. The second-type subframe includes a PUSCH 76 and a special subframe 72, and a second SSS 77 is located in an UwPTS 78. It can be learned from a frame structure in TDD that, the special subframe 72 includes a DwPTS 75, a GP 79, and an UwPTS 78, the special subframe 72 occupies one TTI totally, and cycles at which the special subframe 72 appears in the first-type subframe and the second-type subframe are the same. Therefore, compared with the first SSS 73, the second SSS 77 is one TTI delayed in cycle. As shown in FIG. 7B, the first-type subframe includes a PDSCH 71 and a special subframe 72, a first SSS 73 is located in the last symbol of the PDSCH 71 preceding the special subframe 72, and a first PSS 74 is located in a DwPTS 75. The second-type subframe includes a PUSCH 76 and a special subframe 72, and a second PSS 70 is located in an UwPTS 78. It can be learned from a frame structure in TDD that, the special subframe 72 includes a DwPTS 75, a GP 79, and an UwPTS 78, the special subframe 72 occupies one TTI totally, and cycles at which the special subframe 72 appears in the first-type subframe and the second-type subframe are the same. Therefore, compared with the first SSS 73, the second PSS 70 is one TTI delayed in cycle. Therefore, the second receiving module 63 can extract the second PSS 70 or the second SSS 77 from the second-type subframe when a cycle for obtaining the first SSS 73 is delayed one TTI.

Figure 8A:
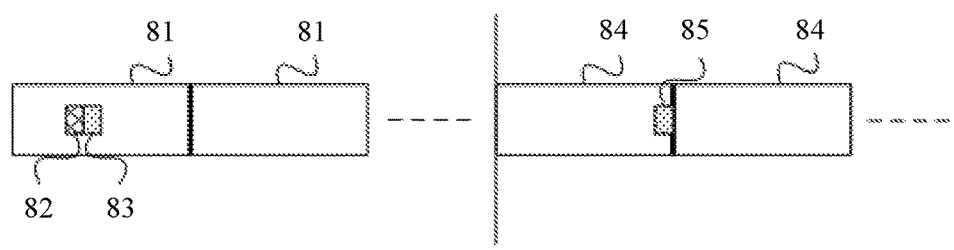
FIG. 8A is a schematic diagram of a frame structure in which a first-type subframe is transmitted in an FDD manner, a second-type subframe is also transmitted in the FDD manner, and the second-type subframe includes a second PSS.
Figure 8B:
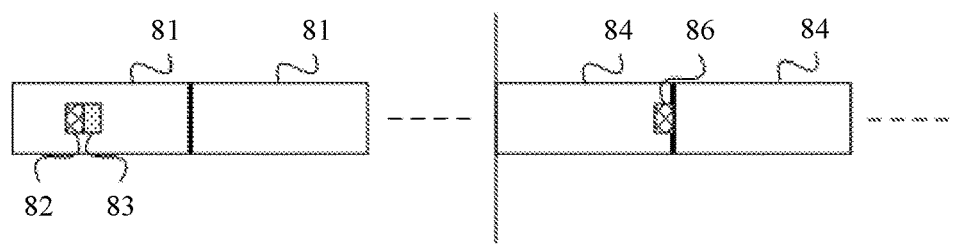
FIG. 8B is a schematic diagram of a frame structure in which a first-type subframe is transmitted in an FDD manner, a second-type subframe is also transmitted in the FDD manner, and the second-type subframe includes a second SSS.

In case 2, that is, the first-type subframe is transmitted in the FDD manner, and the second-type subframe is also transmitted in the FDD manner. The processing module 62 is specifically configured to extract the second PSS or the second SSS from the second-type subframe when a cycle for obtaining the first PSS is delayed 0.5 TTI, and the second PSS or the second SSS is located in the last symbol of the second-type subframe. FIG. 8A and FIG. 8B are used as an example for description. FIG. 8A is a schematic diagram of a frame structure in which the first-type subframe is transmitted in the FDD manner, the second-type subframe is also transmitted in the FDD manner, and the second-type subframe includes the second PSS. FIG. 8B is a schematic diagram a frame structure in which the first-type subframe is transmitted in the FDD manner, the second-type subframe is also transmitted in the FDD manner, and the second-type subframe includes the second SSS.

As shown in FIG. 8A, the first-type subframe includes a PDSCH 81, the PDSCH 81 totally includes 14 symbols, a first SSS 82 is periodically located in the sixth symbol of some PDSCHs 81, and a first PSS 83 is periodically located in the seventh symbol of the PDSCH 81. The second-type subframe includes a PUSCH 84, the PUSCH 84 totally includes 14 symbols, and a second PSS 85 is periodically located in the last symbol of some PUSCHs 84. A cycle of a PUSCH 84 that includes a second PSS 85 is the same as a cycle of a PDSCH 81 that includes a first PSS 83 and a first SSS 82. One PDSCH 81 or one PUSCH 84 occupies one TTI. However, compared with the first PSS 83, the second PSS 85 is seven symbols delayed, that is, 0.5 TTI. As shown in FIG. 8B, the first-type subframe includes a PDSCH 81, the PDSCH 81 totally includes 14 symbols, a first SSS 82 is periodically located in the sixth symbol of some PDSCHs 81, and a first PSS 83 is periodically located in the seventh symbol of the PDSCH 81. The second-type subframe includes a PUSCH 84, the PUSCH 84 totally includes 14 symbols, and a second SSS 86 is periodically located in the last symbol of some PUSCHs 84. A cycle of a PUSCH 84 that includes a second SSS 86 is the same as a cycle of a PDSCH 81 that includes a first PSS 83 and a first SSS 82. One PDSCH 81 or one PUSCH 84 occupies one TTI. However, compared with the first PSS 83, the second SSS 86 is seven symbols delayed, that is, 0.5 TTI. Therefore, the second receiving module 63 can extract the second PSS 85 or the second SSS 86 from the second-type subframe when a cycle for obtaining the first PSS 83 is delayed 0.5 TTI.

In case 3, that is, the first-type subframe is transmitted in the TDD manner, and the second-type subframe is transmitted in the FDD manner. The processing module 62 is specifically configured to extract the second PSS or the second SSS from the second-type subframe within a cycle for obtaining the first SSS, and the second PSS or the second SSS is located in the last symbol of the second-type subframe. FIG. 9A and FIG. 9B are used as an example for description. FIG. 9A is a schematic diagram of a frame structure in which the first-type subframe is transmitted in the TDD manner, the second-type subframe is transmitted in the FDD manner, and the second-type subframe includes the second SSS. FIG. 9B is a schematic diagram of a frame structure in which the first-type subframe is transmitted in the TDD manner, the second-type subframe is transmitted in the FDD manner, and the second-type subframe includes the second PSS.

As shown in FIG. 9A, the first-type subframe includes a PDSCH 91 and a special subframe 92, the special subframe 92 includes a DwPTS 93, a GP 94, and an UwPTS 95, a first SSS 96 is located in the last symbol of the PDSCH 91 preceding the special subframe 92, and a first PSS 97 is located in the DwPTS 93. The second-type subframe includes a PUSCH 98, the PUSCH 98 totally includes 14 symbols, and a second SSS 99 is periodically located in the last symbol of some PUSCHs 98. A cycle of a PUSCH 98 that includes a second SSS 99 is the same as a cycle of a PDSCH 91 that includes a first SSS 96. One PDSCH 91 or one PUSCH 98 occupies one TTI; therefore, the second SSS 99 is located in a cycle of the first SSS 96. As shown in FIG. 9B, the first-type subframe includes a PDSCH 91 and a special subframe 92, the special subframe 92 includes a DwPTS 93, a GP 94, and an UwPTS 95, a first SSS 96 is located in the last symbol of the PDSCH 91 preceding the special subframe 92, and a first PSS 97 is located in the DwPTS 93. The second-type subframe includes a PUSCH 98, the PUSCH 98 totally includes 14 symbols, and a second PSS 90 is periodically located in the last symbol of some PUSCHs 98. A cycle of a PUSCH 98 that includes a second PSS 90 is the same as a cycle of a PDSCH 91 that includes a first SSS 96. One PDSCH 91 or one PUSCH 98 occupies one TTI; therefore, the second PSS 90 is located in a cycle of the first SSS 96. Therefore, the second receiving module 63 can extract the second PSS 90 or the second SSS 99 from the second-type subframe within a cycle for obtaining the first SSS 96.

Further, in the embodiment shown in FIG. 6, after extracting the second PSS or the second SSS from the second-type subframe, the processing module 62 is further configured to: if only the second PSS or the second SSS is extracted, determine that a transmission manner of the first node is switched.

Specifically, the processing module 62 periodically detects a synchronization signal. If the processing module 62 detects the first PSS and the first SSS at the same time, the processing module 62 can determine that the first node is sending the first-type subframe. If the processing module 62 detects only one of the second PSS or the second SSS, the processing module 62 can determine that the transmission manner of the first node is switched, that is, the first node is sending the second-type subframe.

Further, if the processing module 62 determines that the transmission manner of the first node is switched, the processing module 62 is further configured to skip receiving the PUSCH of the second-type subframe. Specifically, if the processing module 62 determines that the transmission manner of the first node is switched, the processing module 62 needs to keep synchronous with the first node only according to the second PSS or the second SSS of the second-type subframe.

FIG. 10 is a flowchart of a first embodiment of a synchronization signal sending method according to an embodiment of the present invention. As shown in FIG. 10, the synchronization signal sending method provided in this embodiment includes:

Step S101: A first node sends a first-type subframe, where the first-type subframe includes a PDSCH and a first synchronization channel, the first synchronization channel includes a first PSS and a first SSS, and the first PSS and the first SSS are used to enable a second node that receives the first PSS and the first SSS to synchronize with the first node.

Step S102: The first node switches from sending the first-type subframe to sending a second-type subframe.

Step S103: The first node sends the second-type subframe, where the second-type subframe includes a PUSCH and a second synchronization channel, the second synchronization channel includes a second PSS or a second SSS, the second PSS or the second SSS is used to enable the second node that receives the second PSS or the second SSS to keep synchronous with the first node, the second PSS is generated according to the first PSS, and the second SSS is generated according to the first SSS.

The synchronization signal sending method in this embodiment is used to complete processing of the synchronization signal sending apparatus shown in FIG. 4. Implementation principles and technical effects of the method and the apparatus are similar, and details are not repeatedly described herein.

Further, in the embodiment shown in FIG. 10, the first synchronization channel is periodically located in the first-type subframe, and the second synchronization channel is periodically located in the second-type subframe.

Further, in the embodiment shown in FIG. 10, a sequence, a modulation and coding format, and a frequency domain resource location that are used by the second PSS are consistent with those used by the first PSS, and a sequence, and a modulation and coding format, and a frequency domain resource location that are used by the second SSS are consistent with those used by the first SSS.

Further, in the embodiment shown in FIG. 10, if the second-type subframe is transmitted in a TDD manner, the second PSS or the second SSS is located in an UwPTS symbol of the second-type subframe.

Further, in the embodiment shown in FIG. 10, if the second-type subframe is transmitted in an FDD manner, the second PSS or the second SSS is located in the last symbol of the second-type subframe.

Figure 11:
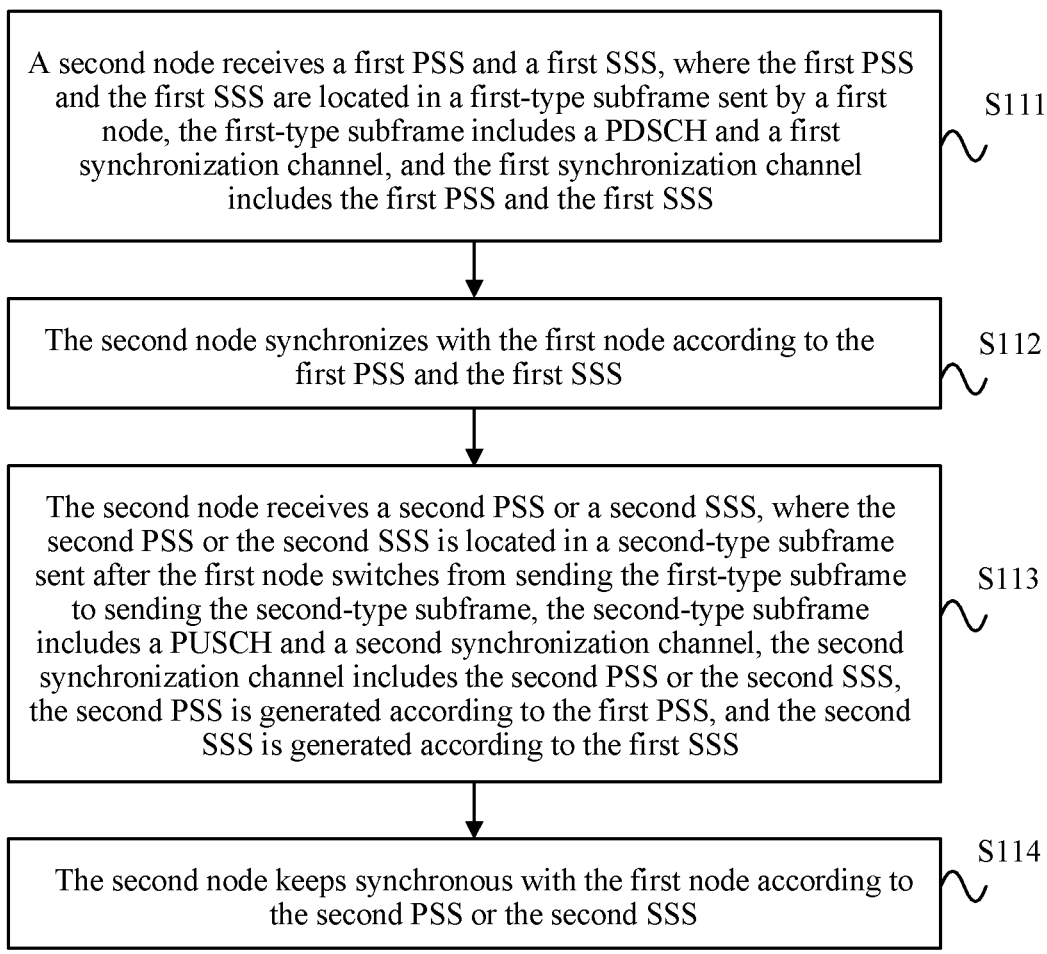
FIG. 11 is a flowchart of a first embodiment of a synchronization signal receiving method according to an embodiment of the present invention.

FIG. 11 is a flowchart of a first embodiment of a synchronization signal receiving method according to an embodiment of the present invention. As shown in FIG. 11, the synchronization signal receiving method provided in this embodiment includes:

Step S111: A second node receives a first PSS and a first SSS, where the first PSS and the first SSS are located in a first-type subframe sent by a first node, the first-type subframe includes a PDSCH and a first synchronization channel, and the first synchronization channel includes the first PSS and the first SSS.

Step S112: The second node synchronizes with the first node according to the first PSS and the first SSS.

Step S113: The second node receives a second PSS or a second SSS, where the second PSS or the second SSS is located in a second-type subframe sent after the first node switches from sending the first-type subframe to sending the second-type subframe, the second-type subframe includes a PUSCH and a second synchronization channel, the second synchronization channel includes the second PSS or the second SSS, the second PSS is generated according to the first PSS, and the second SSS is generated according to the first SSS.

Step S114: The second node keeps synchronous with the first node according to the second PSS or the second SSS.

The synchronization signal receiving method in this embodiment is used to complete processing of the synchronization signal receiving apparatus shown in FIG. 6. Implementation principles and technical effects of the method and the apparatus are similar, and details are not repeatedly described herein.

Further, in the embodiment shown in FIG. 11, the first synchronization channel is periodically located in the first-type subframe, and the second synchronization channel is periodically located in the second-type subframe.

Further, in the embodiment shown in FIG. 11, a sequence, a modulation and coding format, and a frequency domain resource location that are used by the second PSS are consistent with those used by the first PSS, and a sequence, and a modulation and coding format, and a frequency domain resource location that are used by the second SSS are consistent with those used by the first SSS.

Figure 12:
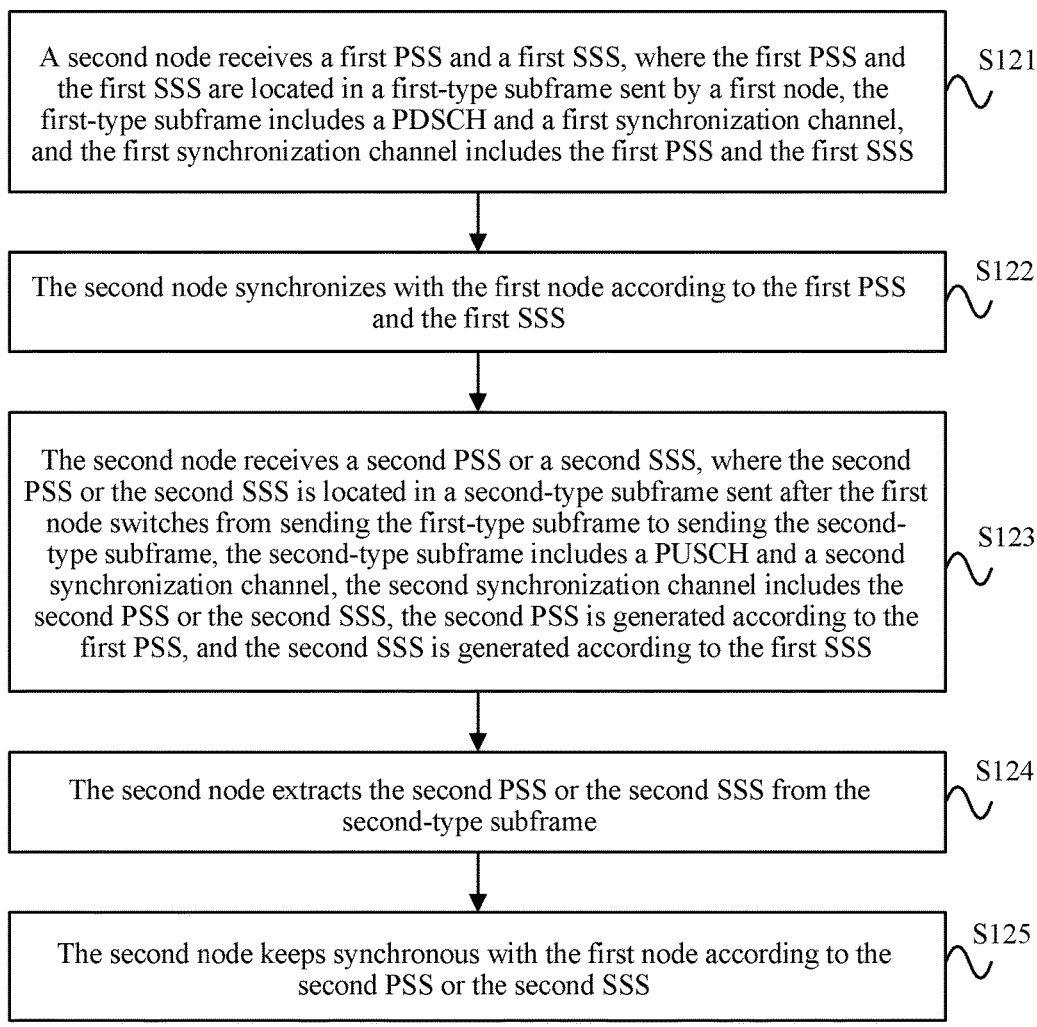
FIG. 12 is a flowchart of a second embodiment of a synchronization signal receiving method according to an embodiment of the present invention.

FIG. 12 is a flowchart of a second embodiment of a synchronization signal receiving method according to an embodiment of the present invention. As shown in FIG. 12, the synchronization signal receiving method provided in this embodiment includes:

Step S121: A second node receives a first PSS and a first SSS, where the first PSS and the first SSS are located in a first-type subframe sent by a first node, the first-type subframe includes a PDSCH and a first synchronization channel, and the first synchronization channel includes the first PSS and the first SSS.

Step S122: The second node synchronizes with the first node according to the first PSS and the first SSS.

Step S123: The second node receives a second PSS or a second SSS, where the second PSS or the second SSS is located in a second-type subframe sent after the first node switches from sending the first-type subframe to sending the second-type subframe, the second-type subframe includes a PUSCH and a second synchronization channel, the second synchronization channel includes the second PSS or the second SSS, the second PSS is generated according to the first PSS, and the second SSS is generated according to the first SSS.

Step S124: The second node extracts the second PSS or the second SSS from the second-type subframe.

Step S125: The second node keeps synchronous with the first node according to the second PSS or the second SSS.

Further, if the first-type subframe is transmitted in a TDD manner, and the second-type subframe is also transmitted in the TDD manner, step S124 includes: the second node extracts the second PSS or the second SSS from the second-type subframe when a cycle for obtaining the first SSS is delayed one TTI, and the second PSS or the second SSS is located in an UwPTS symbol of the second-type subframe.

Further, if the first-type subframe is transmitted in an FDD manner, and the second-type subframe is also transmitted in the FDD manner, step S124 includes: the second node extracts the second PSS or the second SSS from the second-type subframe when a cycle for obtaining the first PSS is delayed 0.5 TTI, and the second PSS or the second SSS is located in the last symbol of the second-type subframe.

Further, if the first-type subframe is transmitted in a TDD manner, and the second-type subframe is transmitted in an FDD manner, step S124 includes: the second node extracts the second PSS or the second SSS from the second-type subframe within a cycle for obtaining the first SSS, and the second PSS or the second SSS is located in the last symbol of the second-type subframe.

Further, in the embodiment shown in FIG. 12, after step S125, the method further includes: if the second node receives only the second PSS or the second SSS, the second node determines that a transmission manner of the first node is switched. After the second node determines that the transmission manner of the first node is switched, the method further includes: the second node determines not to receive the PUSCH of the second-type subframe.

It should be noted that, the sending module 41 in the embodiment of the present invention may be corresponding to a transmitter of the first node, or may be corresponding to a transceiver of the first node. The processing module 42 may be corresponding to a processor of the first node. The processor herein may be a central processing unit (Central Processing Unit, CPU), or an application-specific integrated circuit (Application Specific Integrated Circuit, ASIC), or one or more integrated circuits configured to implement the embodiment of the present invention. The first node may further include a memory. The memory is configured to store instruction code, and the processor invokes the instruction code in the memory, to control the sending module 41 and the processing module 42 in the embodiment of the present invention to perform the foregoing operations.

The receiving module 61 in the embodiment of the present invention may be corresponding to a receiver of the second node, or may be corresponding to a transceiver of the second node. The processing module 62 may be corresponding to a processor of the second node. The processor herein may be a CPU, or an ASIC, or one or more integrated circuits configured to implement the embodiment of the present invention. The second node may further include a memory. The memory is configured to store instruction code, and the processor invokes the instruction code in the memory, to control the receiving module 61 and the processing module 62 in the embodiment of the present invention to perform the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A synchronization signal sending apparatus, wherein the synchronization signal sending apparatus is disposed in a first node, and the synchronization signal sending apparatus comprises:
    a transmitter, configured to send a first-type subframe, wherein the first-type subframe comprises a physical downlink shared channel (PDSCH) and a first synchronization channel, the first synchronization channel comprises a first primary synchronization signal (PSS) and a first secondary synchronization signal (SSS), and the first PSS and the first SSS are used to enable a second node that receives the first PSS and the first SSS to synchronize with the first node; and
    a processor, configured to control the transmitter to switch from sending the first-type subframe to sending a second-type subframe; wherein
    the transmitter is further configured to send the second-type subframe under the control of the processor, wherein the second-type subframe comprises a physical uplink shared channel (PUSCH) and a second synchronization channel, the second synchronization channel comprises a second PSS or a second SSS, the second PSS or the second SSS is used to enable the second node that receives the second PSS or the second SSS to keep synchronous with the first node, the second PSS is generated according to the first PSS, and the second SSS is generated according to the first SSS.

2. The apparatus according to claim 1, wherein the transmitter is configured to send the first-type subframe, wherein the first-type subframe comprises the PDSCH and the first synchronization channel, and the first synchronization channel is periodically located in the first-type subframe; and send the second-type subframe, wherein the second-type subframe comprises the PUSCH and the second synchronization channel, and the second synchronization channel is periodically located in the second-type subframe.

3. The apparatus according to claim 1, wherein the processor is further configured to generate the second PSS according to the following rule: a sequence, a modulation and coding format, and a frequency domain resource location that are used by the second PSS are consistent with those used by the first PSS; and generate the first PSS according to the following rule: a sequence, a modulation and coding format, and a frequency domain resource location that are used by the second SSS are consistent with those used by the first SSS.

4. The apparatus according to claim 1, wherein if the second-type subframe is transmitted in a time division duplex (TDD) manner, the second PSS or the second SSS sent by the transmitter is located in an uplink pilot timeslot (UwPTS) symbol of the second-type subframe.

5. The apparatus according to claim 1, wherein if the second-type subframe is transmitted in a frequency division duplex (FDD) manner, the second PSS or the second SSS sent by the transmitter is located in the last symbol of the second-type subframe.

6. A synchronization signal receiving apparatus, wherein the synchronization signal receiving apparatus is disposed in a second node, and the synchronization signal receiving apparatus comprises:
    a receiver, configured to receive a first primary synchronization signal (PSS) and a first secondary synchronization signal (SSS), wherein the first PSS and the first SSS are located in a first-type subframe sent by a first node, the first-type subframe comprises a physical downlink shared channel (PDSCH) and a first synchronization channel, and the first synchronization channel comprises the first PSS and the first SSS; and
    a processor, configured to synchronize with the first node according to the first PSS and the first SSS; wherein
    the receiver is further configured to receive a second PSS or a second SSS, wherein the second PSS or the second SSS is located in a second-type subframe sent after the first node switches from sending the first-type subframe to sending the second-type subframe, the second-type subframe comprises a physical uplink shared channel (PUSCH) and a second synchronization channel, the second synchronization channel comprises the second PSS or the second SSS, the second PSS is generated according to the first PSS, and the second SSS is generated according to the first SSS; and
    the processor is further configured to keep synchronous with the first node according to the second PSS or the second SSS.

7. The apparatus according to claim 6, wherein the receiver is configured to receive the first PSS and the first SSS, wherein the first PSS and the first SSS are located in the first-type subframe sent by the first node, the first-type subframe comprises the PDSCH and the first synchronization channel, the first synchronization channel is periodically located in the first-type subframe, and the first synchronization channel comprises the first PSS and the first SSS; and receive the second PSS or the second SSS, wherein the second PSS or the second SSS is located in the second-type subframe sent after the first node switches from sending the first-type subframe to sending the second-type subframe, the second-type subframe comprises the PUSCH and the second synchronization channel, the second synchronization channel is periodically located in the second-type subframe, and the second synchronization channel comprises the second PSS or the second SSS.

8. The apparatus according to claim 6, wherein the processor is further configured to extract the second PSS or the second SSS from the second-type subframe before keeping synchronous with the first node according to the second PSS or the second SSS.

9. The apparatus according to claim 8, wherein if the first-type subframe is transmitted in a time division duplex (TDD) manner, and the second-type subframe is also transmitted in the TDD manner, the processor is configured to extract the second PSS or the second SSS from the second-type subframe when a cycle for obtaining the first SSS is delayed one transmission time interval (TTI), wherein the second PSS or the second SSS is located in an uplink pilot timeslot (UwPTS) symbol of the second-type subframe.

10. The apparatus according to claim 8, wherein if the first-type subframe is transmitted in a frequency division duplex (FDD) manner, and the second-type subframe is also transmitted in the FDD manner, the processor is configured to extract the second PSS or the second SSS from the second-type subframe when a cycle for obtaining the first PSS is delayed 0.5 TTI, wherein the second PSS or the second SSS is located in the last symbol of the second-type subframe.

11. A synchronization signal sending method, comprising:
sending, by a first node, a first-type subframe, wherein the first-type subframe comprises a physical downlink shared channel (PDSCH) and a first synchronization channel, the first synchronization channel comprises a first primary synchronization signal (PSS) and a first secondary synchronization signal (SSS), and the first PSS and the first SSS are used to enable a second node that receives the first PSS and the first SSS to synchronize with the first node;
switching, by the first node, from sending the first-type subframe to sending a second-type subframe; and
sending, by the first node, the second-type subframe, wherein the second-type subframe comprises a physical uplink shared channel (PUSCH) and a second synchronization channel, the second synchronization channel comprises a second PSS or a second SSS, the second PSS or the second SSS is used to enable the second node that receives the second PSS or the second SSS to keep synchronous with the first node, the second PSS is generated according to the first PSS, and the second SSS is generated according to the first SSS.

12. The method according to claim 11, wherein the first synchronization channel is periodically located in the first-type subframe, and the second synchronization channel is periodically located in the second-type subframe.

13. The method according to claim 11, wherein a sequence, a modulation and coding format, and a frequency domain resource location that are used by the second PSS are consistent with those used by the first PSS, and a sequence, and a modulation and coding format, and a frequency domain resource location that are used by the second SSS are consistent with those used by the first SSS.

14. The method according to claim 11, wherein if the second-type subframe is transmitted in a time division duplex (TDD) manner, the second PSS or the second SSS is located in an uplink pilot timeslot (UwPTS) symbol of the second-type subframe.

15. The method according to claim 11, wherein if the second-type subframe is transmitted in a frequency division duplex (FDD) manner, the second PSS or the second SSS is located in the last symbol of the second-type subframe.

16. A synchronization signal receiving method, comprising:
receiving, by a second node, a first primary synchronization signal (PSS) and a first secondary synchronization signal (SSS), wherein the first PSS and the first SSS are located in a first-type subframe sent by a first node, the first-type subframe comprises a physical downlink shared channel (PDSCH) and a first synchronization channel, and the first synchronization channel comprises the first PSS and the first SSS;
synchronizing, by the second node, with the first node according to the first PSS and the first SSS;
receiving, by the second node, a second PSS or a second SSS, wherein the second PSS or the second SSS is located in a second-type subframe sent after the first node switches from sending the first-type subframe to sending the second-type subframe, the second-type subframe comprises a physical uplink shared channel (PUSCH) and a second synchronization channel, the second synchronization channel comprises the second PSS or the second SSS, the second PSS is generated according to the first PSS, and the second SSS is generated according to the first SSS; and
keeping, by the second node, synchronous with the first node according to the second PSS or the second SSS.

17. The method according to claim 16, wherein the first synchronization channel is periodically located in the first-type subframe, and the second synchronization channel is periodically located in the second-type subframe.

18. The method according to claim 16, wherein before the keeping, by the second node, synchronous with the first node according to the second PSS or the second SSS, the method further comprises:
extracting, by the second node, the second PSS or the second SSS from the second-type subframe.

19. The method according to claim 18, wherein if the first-type subframe is transmitted in a time division duplex (TDD) manner, and the second-type subframe is also transmitted in the TDD manner, the extracting, by the second node, the second PSS or the second SSS from the second-type subframe comprises:
extracting, by the second node, the second PSS or the second SSS from the second-type subframe when a cycle for obtaining the first SSS is delayed one transmission time interval (TTI), wherein the second PSS or the second SSS is located in an uplink pilot timeslot (UwPTS) symbol of the second-type subframe.

20. The method according to claim 18, wherein if the first-type subframe is transmitted in a frequency division duplex (FDD) manner, and the second-type subframe is also transmitted in the FDD manner, the extracting, by the second node, the second PSS or the second SSS from the second-type subframe comprises:
extracting, by the second node, the second PSS or the second SSS from the second-type subframe when a cycle for obtaining the first PSS is delayed 0.5 TTI, wherein the second PSS or the second SSS is located in the last symbol of the second-type subframe.

* * * * *